US008296229B1

(12) United States Patent
Yellin et al.

(10) Patent No.: US 8,296,229 B1
(45) Date of Patent: Oct. 23, 2012

(54) METHOD AND SYSTEM FOR ASSOCIATING CONSUMERS WITH PURCHASE TRANSACTIONS

(75) Inventors: Eric Yellin, Stony Brook, NY (US); Susan Moon, Manhasset, NY (US); Ntiedo Etuk, New York, NY (US)

(73) Assignee: Citicorp Credit Services, Inc., Long Island, NY (US)

( * ) Notice: Subject to any disclaimer, the term of this patent is extended or adjusted under 35 U.S.C. 154(b) by 1582 days.

(21) Appl. No.: 10/868,818

(22) Filed: Jun. 17, 2004

Related U.S. Application Data

(60) Provisional application No. 60/478,828, filed on Jun. 17, 2003.

(51) Int. Cl.
*G06Q 40/00* (2006.01)

(52) U.S. Cl. .......................................................... 705/39

(58) Field of Classification Search .................. 705/24, 705/26, 39
See application file for complete search history.

(56) References Cited

U.S. PATENT DOCUMENTS

| | | | |
|---|---|---|---|
| 5,056,019 A | 10/1991 | Schultz et al. ................. 705/14 |
| 6,292,789 B1 | 9/2001 | Schutzer ......................... 705/40 |
| 6,381,582 B1 * | 4/2002 | Walker et al. ................... 705/26 |
| 6,533,168 B1 * | 3/2003 | Ching ............................ 235/375 |
| 6,738,749 B1 * | 5/2004 | Chasko ........................... 705/17 |
| 6,961,710 B1 * | 11/2005 | Yanagisawa et al. ........... 705/24 |
| 7,013,290 B2 * | 3/2006 | Ananian ..................... 705/26.42 |
| 7,181,416 B2 * | 2/2007 | Arias .............................. 705/24 |
| 7,197,475 B1 * | 3/2007 | Lorenzen et al. .............. 705/26 |
| 7,299,970 B1 * | 11/2007 | Ching ........................... 235/375 |
| 7,379,899 B1 * | 5/2008 | Junger ............................ 705/24 |
| 7,797,192 B2 * | 9/2010 | Mitchell et al. ................ 705/16 |
| 2001/0027424 A1 * | 10/2001 | Torigoe .......................... 705/26 |
| 2001/0029470 A1 | 10/2001 | Schultz et al. ................. 705/26 |
| 2001/0029483 A1 | 10/2001 | Schultz et al. ................. 705/39 |
| 2001/0029484 A1 | 10/2001 | Schultz et al. ................. 705/39 |
| 2002/0084320 A1 * | 7/2002 | Hoffman et al. .............. 235/379 |
| 2002/0109007 A1 | 8/2002 | Hoffman ....................... 235/375 |
| 2002/0178028 A1 * | 11/2002 | King ............................... 705/1 |
| 2002/0188559 A1 * | 12/2002 | Schultz .......................... 705/39 |
| 2002/0188561 A1 | 12/2002 | Schultz .......................... 705/40 |
| 2003/0018578 A1 | 1/2003 | Schultz .......................... 705/39 |
| 2003/0055733 A1 * | 3/2003 | Marshall et al. ............... 705/24 |
| 2004/0010462 A1 | 1/2004 | Moon et al. ................... 705/39 |
| 2004/0225567 A1 * | 11/2004 | Mitchell et al. ................ 705/16 |
| 2004/0243489 A1 * | 12/2004 | Mitchell et al. ................ 705/30 |
| 2007/0073586 A1 * | 3/2007 | Dev et al. ....................... 705/14 |
| 2007/0255629 A1 * | 11/2007 | Tillman ......................... 705/26 |

OTHER PUBLICATIONS

Mark Schwanhausser. "Double-edged card / Behind the Reward System Lurks Afee Waiting to Happen-With Just a Pushof a Button :[2 STAR Edition]." Houston Chronicle Jun. 3, 2002, ProQuest Newsstand, ProQuest. Web. Jun. 18, 2012.*

(Continued)

*Primary Examiner* — Seye Iwarere
(74) *Attorney, Agent, or Firm* — Eric L. Sophir; SNR Denton US LLP

(57) ABSTRACT

A system and method for associating consumers with their purchases so that consumer transactions can be tied back to a particular consumer is described. More particularly, a central transaction entity as part of a larger network collects, aggregates, manages and mines consumer transaction data from at least consumer and merchant members of the network for the purpose of routing electronic purchase history to consumers and allowing merchant analysis of consumer behavior in order to create consumer profiles to better service consumers and provide more personalized offers.

7 Claims, 4 Drawing Sheets

OTHER PUBLICATIONS

ARTS, "Digital Receipt Work Team Charter, ARTS-IXRetail Candidate Recommendation" [online], Jan. 11, 2002 [retrieved on Jan. 29, 2002], 21 pp., Retrieved from the Internet: http://www.nrf-arts.org/Schema/DigitalReceipt/Chapter/.

* cited by examiner

METHOD AND SYSTEM FOR ASSOCIATING CONSUMERS WITH PURCHASE TRANSACTIONS

CROSS-REFERENCE TO RELATED APPLICATIONS

The present application claims priority to U.S. Provisional Application No. 60/478,828 filed Jun. 17, 2003 entitled "Method and System for Purchase Receipt Management" which is incorporated herein by reference in its entirety.

BACKGROUND OF THE INVENTION

1. Field of the Invention

The invention relates generally to associating consumers with their purchases so that consumer transactions can be tied back to a particular consumer. More particularly, the invention relates to the aggregation, management and data mining of consumer purchasing information for the purpose of routing electronic purchase history to consumers and allowing merchant analysis of consumer behavior in order to create consumer profiles to better service consumers and provide more personalized offers.

2. Description of the Related Art

Current receipt management systems do not use aggregated receipt data to facilitate a broad range of post-purchase activities. While certain corporate purchasing cards access Level III purchase data (described further below) for the purposes of automated employee expense control and reimbursement, this purchase data is not utilized to benefit merchants and consumers in the facilitation of a broad range of post-purchase activities. Further, while some merchants offer detailed purchase histories to consumers, these detailed histories are limited to purchases at that particular merchant in order to facilitate merchandise returns.

Currently, consumers' wallets are filled with loyalty and membership club cards, shopper's club cards, frequent shoppers cards, and the like. Consumers must carry and utilize separate merchant membership cards for use with individual merchants. Merchants administer these programs to associate consumers with their respective purchases for the purposes of analysis and relationship management.

SUMMARY OF THE INVENTION

According to an embodiment of the present invention, a process for managing purchase receipt data is described. The process includes enrolling at least one consumer with a receipt manager system by assigning a unique consumer identifier to the at least one consumer and associating at least one consumer payment vehicle with the unique consumer identifier. Next, the process includes enrolling at least one merchant with the receipt manager system and providing the at least one enrolled merchant with instructions for identifying unique consumer identifiers and instructions for forwarding purchase receipt data to the receipt manager system. The purchase receipt data associated with at least one unique consumer identifier is received and aggregated according to the at least one unique consumer identifier.

In another embodiment of the present invention a process for managing purchase receipt data is described. The process includes enrolling at least one consumer with a receipt manager system by assigning a unique consumer identifier to the at least one consumer and associating at least one consumer payment vehicle with the unique consumer identifier. The process further includes enrolling at least one merchant with the receipt manager system and receiving access instructions from the at least one enrolled merchant for accessing consumer purchase receipt data. The consumer purchase receipt data is accessed at the at least one enrolled merchant to identify consumer purchase receipt data that is associated with at least one unique consumer identifier and aggregated according to the at least one unique consumer identifier.

In still a further embodiment of the present invention a process for managing purchase receipt data is described. The process includes enrolling at least one consumer with a receipt manager system by assigning a unique consumer identifier to the at least one consumer and associating at least one consumer payment vehicle with the unique consumer identifier. Next, purchase receipt data is received at a third party service provider, the purchase receipt data including at least the unique consumer identifier and a merchant identifier for each transaction. The consumer purchase receipt data is forwarded to the receipt manager system and aggregated according to the at least one unique consumer identifier.

In yet another embodiment of the present invention a process for managing multiple memberships is described. The process includes enrolling at least one consumer with a membership management system by assigning a unique consumer identifier to the at least one consumer and associating multiple consumer merchant memberships with the unique consumer identifier. The process also includes enrolling merchants associated with the multiple consumer merchant memberships with the membership management system and receiving instructions from the enrolled merchants defining the parameters for each of the multiple consumer merchant memberships. The process further includes providing instructions for identifying unique consumer identifiers, acquiring consumer merchant membership data associated with at least one unique consumer identifier and aggregating received consumer merchant membership data according to the at least one unique consumer identifier.

In a further embodiment of the present invention a process for aggregating consumer transaction data is described. The process includes establishing a receipt management network including at least one transaction manager, multiple member consumers and multiple member merchants, each of the multiple member consumers being identified via a unique consumer identifier and each of the multiple member consumers having at least one payment vehicle controlled by the at least one transaction manager. The process further includes collecting member consumer purchase information from the at least one transaction manager, the member consumer purchase information including first member consumer purchase information from the multiple member merchants and second member consumer purchase information from non-member merchants based on each of the member consumers' use of their at least one payment vehicle and aggregating the collected first and second member consumer purchase information for review by at least one of the multiple member merchants.

DOCUMENTS FOR INCORPORATION BY REFERENCE

The teachings disclosed in the following documents are hereby incorporated by reference herein in their entireties:
U.S. Pat. No. 5,056,019,
U.S. Pat. No. 6,292,789, and
U.S. patent application Ser. No. 10/411,192 filed Apr. 11, 2003 entitled "METHOD AND SYSTEM FOR A MULTI-PURPOSE TRANSACTIONAL PLATFORM."

DESCRIPTION OF THE INVENTION

Figure 1:
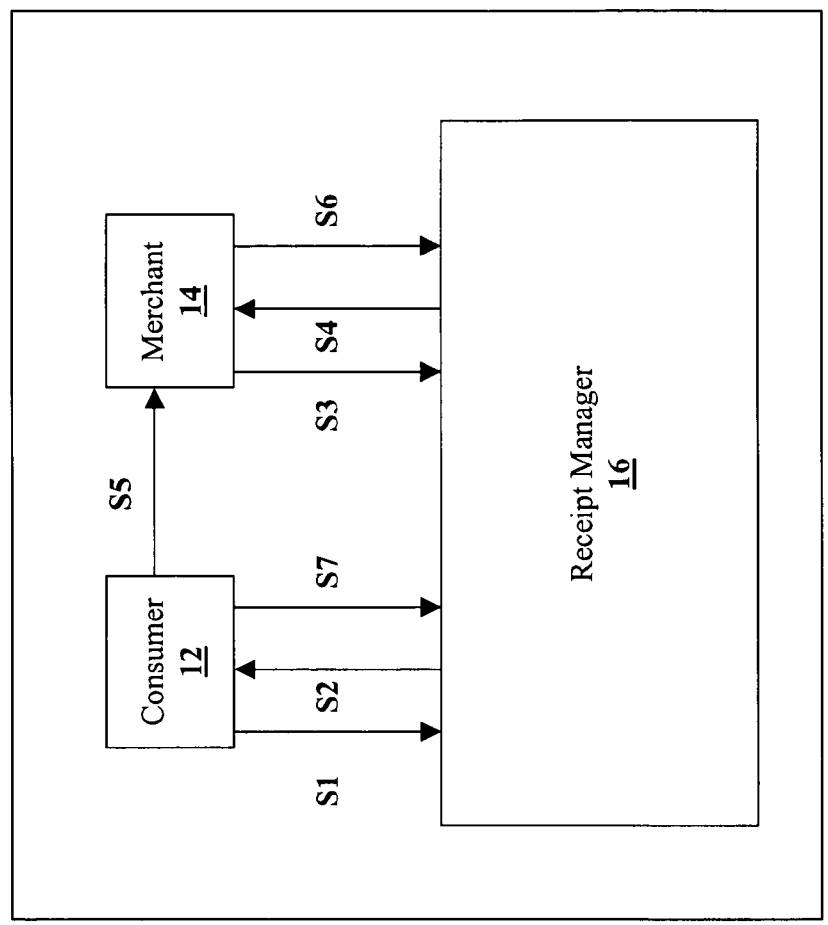
FIG. 1 shows a schematic system and method for an exemplary receipt management network according to an embodiment of the present invention.

Referring to FIG. 1, in an embodiment of the present invention, a receipt management network (hereafter "RMN") 10 includes at least one consumer 12, at least one merchant 14 and a receipt manager 16. A preferred embodiment includes multiple consumers and multiple merchants. As used herein, consumers may be individuals, businesses or any other purchasing entity and need not be affiliated with any of the other network entities unless specifically stated herein as being so. Initially, the consumer 12 enrolls in the RMN through various available processes, including, but not limited to, on-line registration, mail-in registration and telephonic registration S1. Consumer registration is acknowledged and completed through assignment of a unique consumer identifier (hereafter "CID") S2. Similarly, the merchant 14 enrolls in the RMN as well S3, with enrollment completed via acknowledgment by the receipt manager and assignment of a merchant identifier (hereafter "MID") S4. Additionally, the receipt manager may provide the merchant with CID identification and forwarding software for installation on the merchant's purchase processing system. This software facilitates the identification of member consumers through, for example, a membership listing, e.g., look-up table, and includes routing instructions for forwarding identified member consumer receipt information to the receipt manager. Alternatively, using established network communication lines, the receipt manager may identify associated CIDs within a merchant database(s) and retrieve receipt information using pre-established interfacing routines.

Once enrollment is complete, upon a member consumer completing a purchase from a member merchant S5, the receipt manager receives receipt information from the merchant S6. The consumer may also receive a receipt at the time of purchase, i.e., electronic receipt for Internet purchase or hardcopy receipt for brick and mortar purchase or telephone purchase. The receipt information may include itemized receipt data. The itemized data can be sent to the receipt manager directly at the time of purchase from the point of sale (hereafter "POS") or it can be sent via a periodic batched transfer. Preferably, the receipt capture and forwarding processes are electronic, but portions of the process may be manual if necessary. For example, in an alternative embodiment, a member consumer may input receipt information directly with the receipt manager for non-member merchants, e.g., by scanning in a copy of the receipt or manually entering details through a graphical user interface on the receipt manager's website S7. The itemized receipts are associated with the consumer according to the CID collected at the POS. The receipt manager receives and stores the itemized receipts according to the CID. The RMN facilitates receipt aggregation and the mining and formatting of data from aggregated receipts in order to reduce certain consumer service costs incurred by all aforementioned parties and increase revenue through targeted sales based on the mined data and enhanced consumer service. The consumers participate in the receipt network in order to receive their purchase receipt electronically so that it can be used conveniently for several post purchase activities including returns, (tax) records, rebates, warranties, repeat purchases and reminders via the receipt management application described herein.

Aggregating a group of merchants that wish to participate and establishing connectivity from each to the receipt manager for the purposes of purchase data routing will establish a network of member merchants. These connections may leverage existing payment and data network infrastructure (e.g. Internet, MasterCard network) in whole or in part. The network may utilize a single standard technology or a plurality of technologies to route purchase data to the receipt manager.

Figure 2:
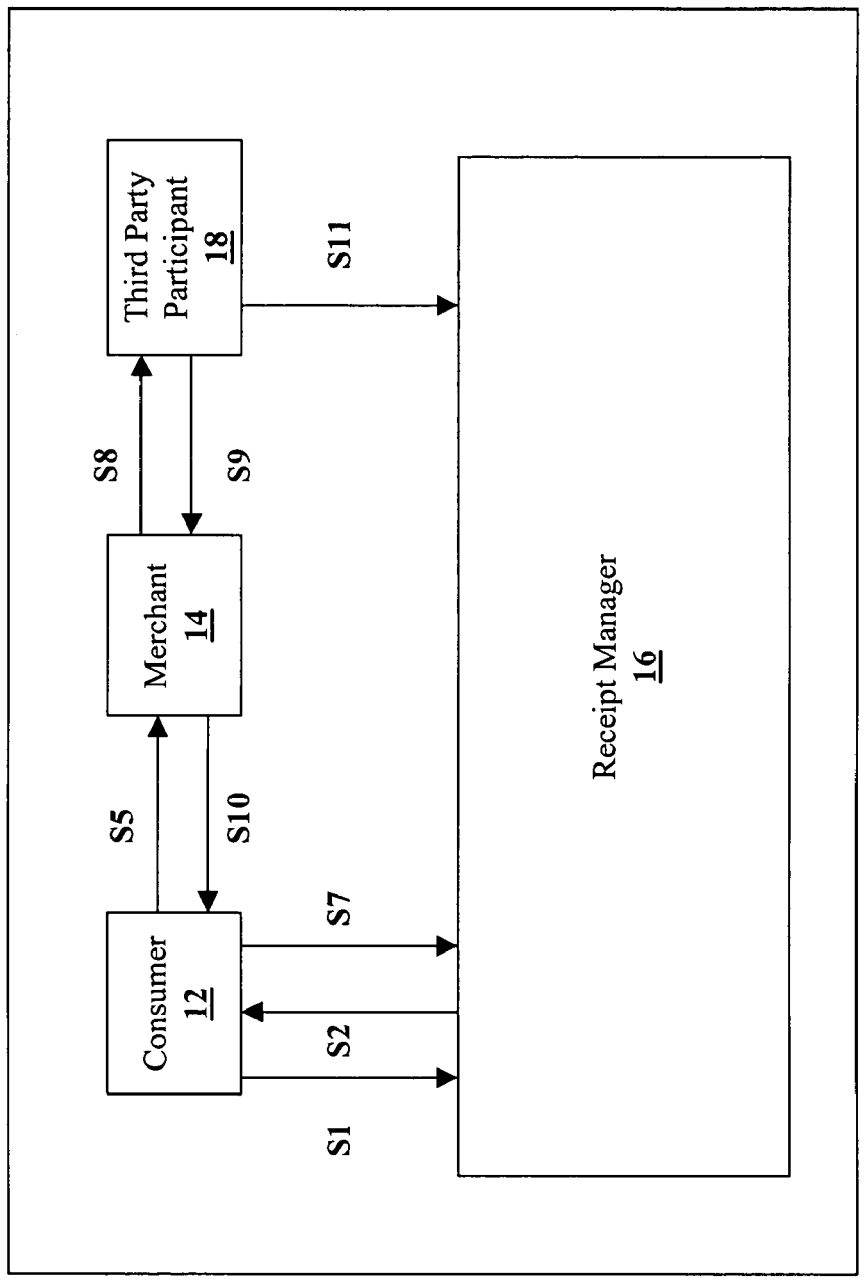
FIG. 2 shows a schematic system and method for an exemplary receipt management network according to an embodiment of the present invention.

Referring to FIG. 2, in an alternative embodiment, the RMN 10 further includes a third party participant 18. In this alternative embodiment, instead of receiving receipt data from the merchant(s) 14, the receipt manager 16 receives receipt data, or at least part of the receipt data, from a third party participant 18, such as a credit authorization entity (e.g., MasterCard, Visa, etc.), a financial institution, an electronic fund transfer (EFT) entity or the like S11. By way of example, whenever a member consumer utilizes a credit payment vehicle, e.g., credit card, to make a purchase from a merchant, the payment authority receives a payment authorization request from a merchant S8. According to this alternative embodiment, once the payment authority authorizes the request, the payment authority forwards authorization to the merchant S9 and sends extracted authorization data to the receipt manager S11. In this embodiment, the non-member merchant may provide the consumer with a receipt S10 since the non-member merchant is not aware of the consumer's membership in the RMN. Alternatively, the merchant 14 is a member of the RMN 10, but elects to have a third party participant 18 handle the CID identification and receipt forwarding process. As stated above, these embodiments which utilize a third party participant may leverage existing payment and data network infrastructure (e.g. Internet, MasterCard network) in whole or in part.

The purpose of the CID is to associate a particular transaction with a specific consumer so that itemized purchase (e.g., receipt) data is routed and assigned correctly to the consumer purchaser. In a particular embodiment, the CID is assigned to the consumer through a particular payment method, for example, a particular payment vehicle, e.g., credit, debit, stored value, home equity account or the like, through the receipt manager. The payment vehicle may or may not be issued by the receipt manager. For example, referring to S1 of FIGS. 1 and 2, in a particular embodiment, when a consumer enrolls in the RMN, a consumer could (1) request that an existing credit or debit account number be utilized as a CID; (2) request a unique CID in association with an existing credit or debit account; (3) request a separate unique CD for each of the consumer's existing credit or debit accounts; (4) request a single OD that is linked to each of the consumer's existing credit or debit accounts; (5) request one or more new credit or debit accounts which may be linked with one or more CIDs. In this particular embodiment, whenever the consumer utilizes one of the linked credit or debit accounts to make a purchase, the account number is matched against a database listing of enrolled account numbers with corresponding CIDs. For account numbers that are enrolled, the corresponding CD is assigned to the transaction and the CID and the receipt are forwarded (electronically or manually) to the receipt manager according to the CID.

Alternatively, the consumer may be assigned a CID through the receipt manager independent of any particular payment vehicle. This OD may be carried on, for example, a card, which may be read, e.g., scanned at the POS or verbally associated with a transaction by the consumer at the POS or manually entered by the consumer when making an on-line purchase. Consumers present this card or number at the POS in order to be identified as program participants and ensure that all consumer purchase receipts, regardless of payment vehicle selected at POS, e.g. cash, check, credit card, debit card, are associated with the consumer and transmitted to the receipt manager.

Once the receipt manager receives the itemized receipts, the receipt manager is able to organize, store and present the information from the itemized receipts for review by the consumer. Itemized receipts contain detailed information including merchant information (e.g., merchant name/brand), item or service description (e.g., Hewlett Packard HP 750 Ink-jet Printer) and price information ($129.00+10% tax=$141.90), payment vehicle information (Citibank MasterCard with last 4 account number digits), time of purchase information (Apr. 26, 2003, 6:00 pm EST), and the like. Detailed Information may include, but is not limited to, Level III data fields as they are defined in the credit card industry. Level III data includes line item details, e.g., item by item descriptions of each component of the purchase, and other data such as, but not limited to quantities, product code, product description, brand identification, stock keeping unit (SKU), ship-to-zip, freight amount and duty amount, order/ticket number, unit of measure, extended item amount, discount indicator, discount amount, net/gross indicator, tax rate applied, tax type applied, debit or credit indicator, and alternate tax identifier. The receipt information may be viewed on-line by the consumer, in a consumer selected format, e.g., according to merchant, according to payment vehicle, according to category of goods or services, according to price, according to purchase date and the like. This receipt aggregation and presentation allows consumers to view all receipts on a single website. Alternatively, the receipt manager can provide formatted information to individual merchants, for posting on merchant websites for review by individual merchant consumers. The data can be stored in the receipt manager's databases and/or it can be downloaded at consumer request to a personal computer and/or PDA device. The data can be incorporated into personal financial management software for budgeting, taxes or other purposes.

In addition to the aggregation and formatting services provided by the receipt manager, other value-added tools for receipt management can be provided. These value-add tools include prompts for using data in the aggregated consumer receipts for record-keeping purposes, for budgeting purposes, for tax record purposes. More particularly, receipt data may be used to continually and automatically update consumer-created shopping lists and/or personal registry, e.g., wish, lists. The receipt management system described herein may be used as a personal accountant for each individual consumer.

Additionally or alternatively, the receipt manager may merge the receipt data with consumer payment vehicle spending data. For example, in those cases where the receipt manager also issues the payment vehicle, the receipt manager may use the receipt data in conjunction with payment vehicle spend data for consumer targeting and consumer relationship management (CRM) purposes, and also for economic forecasting, both industry forecasting and/or forecasting relating to a specific merchant. Consumer receipt data may be used by the receipt manager and/or other consumer service entities in order to better ascertain and understand consumer spending habits and improve marketing and targeting techniques, e.g., create consumer profiles to better service consumers and provide more personalized offers.

Figure 3:
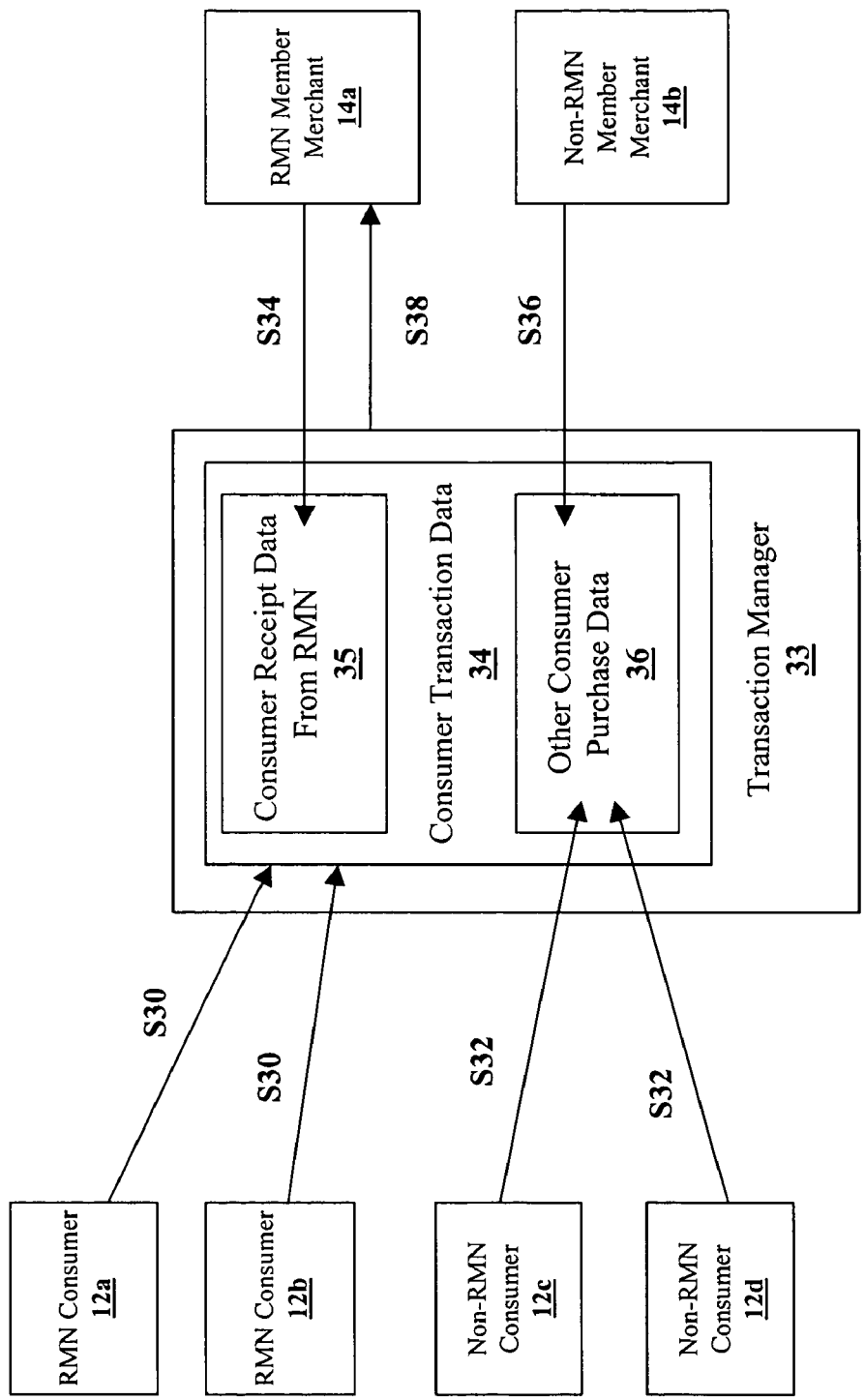
FIG. 3 shows a schematic system and method for an exemplary data aggregation network according to an embodiment of the present invention.

Referring to FIG. 3, a specific exemplary embodiment is shown wherein the data from the RMN is used in conjunction with other transaction data, i.e., consumer payment vehicle spending data, in order to provide useful consumer transaction data to member RMN merchants. In FIG. 3, the transaction manager 33 receives consumer transaction data 34 in the form of consumer receipt data 35 and other consumer transaction data 36 from the RMN member merchant 14a, S34. In this embodiment, the transaction manager 33 functions as the receipt manager as described above and is, for example, a financial institution capable of offering financial payment services to consumers such as credit and debit accounts. The transaction manager 33 has established payment vehicle relationships with both RMN member consumers 12a and 12b (S30) and non-RMN member consumers 12c and 12d (S32). The transaction manager 33 also receives other consumer purchase data 36 from non-RMN member merchants 14b for both RMN member consumers 12a and 12b and non-RMN member consumers 12c and 12d. By way of example, other transaction data might include credit card purchase data for a RMN member consumer for transactions with non-RMN member merchants. Utilizing all of the consumer transaction data 34, the transaction manager 33 aggregates the transaction data in order to ascertain and analyze the purchasing habits of consumers through their use of the payment vehicles, i.e., payment accounts for the consumers that are managed by the transaction manager 33.

By way of particular example, assuming RMN member merchant 14a is Best Buy, the transaction manager 33 receives consumer receipt data 35 for purchases at Best Buy buy RMN member consumers 12b, 12b (S34). This data is detailed, Level III data, such as purchase type data, e.g., DVDs. The transaction manager 33 is also collecting other RMN member consumer purchase data for purchases made with a transaction manager sponsored payment vehicle outside of the RMN, e.g., from non-RMN member merchants 14b (S36). So for example, this data might show that while the RMN member consumers 12b, 12b are loyally purchasing DVDs from Best Buy, the same RMN member consumers 12b, 12b are purchasing electronics from other stores in the electronics industry. Further still, the transaction manager 33 aggregates all of the collected consumer transaction data 34 and provides high level reports to the RMN member merchants 14a (S38).

In a further embodiment of the present invention, the receipt manager facilitates the granting of rebates for eligible merchants and consumers. In this embodiment, an eligible merchant, i.e., a merchant or manufacturer signed up with the receipt manager's receipt management system, notifies the receipt manager if a consumer uses applicable merchant or manufacturer rebates during a purchase. This notification may be performed in real-time or through batch processing. The rebate could be associated with the consumer's CID. The receipt manager, at the request of the merchant, fulfills that rebate electronically, e.g., on the day of the sale to the consumer's payment vehicle of choice or by default to the payment vehicle used to make the initial purchase or, in certain instances, to a financial account of the consumer, e.g., checking, savings, investment or the like. The rebate could be fulfilled instantly or not, depending on the capabilities and business interests of the rebate issuing entity (manufacturer or retailer). This electronic rebate process eliminates the need for the paper-intensive rebate system that requires the consumer to make a copy of the payment receipt, send in the proof-of-purchase, which is typically in the form of a UPC symbol and then wait several weeks for the manufacturer to process that rebate and then remit payment. This system will also enable fraud controls for the rebate process that will prevent fraudulent rebate redemption and will reverse rebate payments for items that are returned after a rebate is paid.

In a particular example, a member manufacturer (e.g., Sony) who participates in the automatic rebate service provided by the receipt manager offers a rebate on a specific good (e.g., Digital Video Disc (DVD) player). A member consumer shopping at a member merchant store, brick and mortar or on-line, e.g., Best Buy, peruses the available DVD players. The member consumer finds that Sony offers an automatic rebate through the receipt management network and chooses the Sony DVD player over other potential choices from other manufacturers.

In another embodiment of the present invention, membership in the receipt management network facilitates product registration for warranties and other purposes. In addition, the receipt management application can serve as a consolidated source for product information (e.g. manuals, directions) related to past purchases. This information may be stored with the receipt manager or may reside with the respective merchants. In such case, links to the merchant's web site can lead consumers to desired information. The receipt management application can also present intelligent offers based on purchase history that are tailored for a specific consumer with a particular purchase history.

In a further embodiment of the present invention, membership in the receipt management network facilitates more efficient merchandise returns by consumers and protects both merchants and consumers from fraud. Member consumers do not have to worry about losing receipts, and possibly not being able to return merchandise, since the receipts are stored electronically within the receipt management network and accessible to the merchants. Consumers can opt to simply print receipts from their personal computer, or they can rely on member merchants to electronically retrieve their receipt data in-store (for merchants that opt to do so). This receipt storage allows merchants to check the identity of the consumer with the receipt prior to returning value to the consumer. Further still, the merchant may credit value to the payment vehicle that was used in the transaction, thus protecting the consumer as well as the merchant from fraud. Because the receipt management network also keeps the payment details of the transaction, the network protects merchants from those member consumers who might try (accidentally or purposefully) to return an item to a different merchant store, i.e., within the merchant's integrated back-end system connecting all stores, for store credit that is in excess of what they originally paid.

Figure 4:
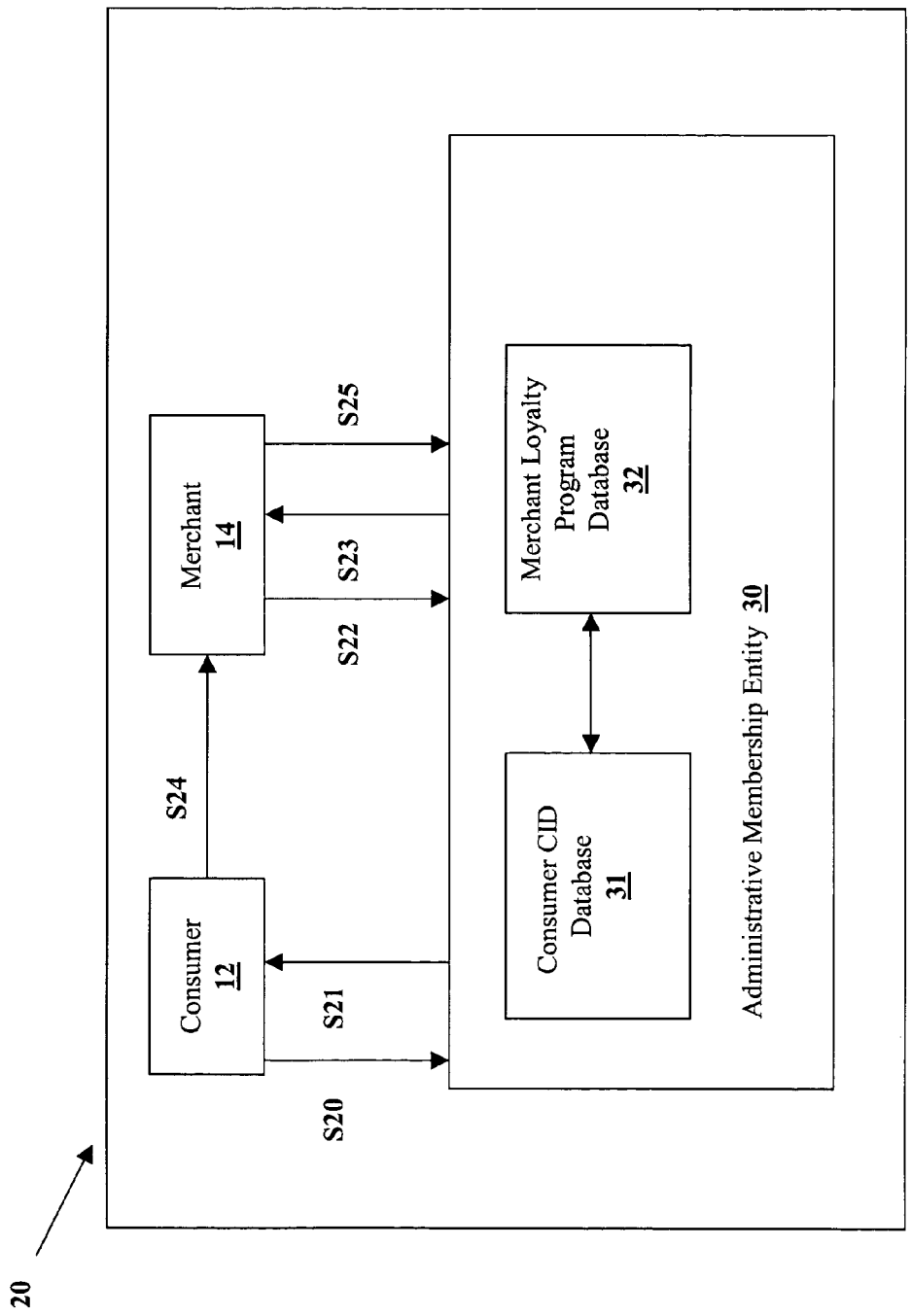
FIG. 4 shows a schematic system and method for an exemplary membership consolidation network according to an embodiment of the present invention.

Referring to FIG. 4, in a further embodiment of the present invention, similar to FIG. 1, a membership consolidation network ("MCN") 12 includes at least one consumer 12, at least one merchant 14 and an administrative membership entity 30. A preferred embodiment includes multiple consumers and multiple merchants. Consumers may be individuals, businesses or any other purchasing entity. Initially, the consumer 12 enrolls in the MCN through various available processes, including, but not limited to, on-line registration, mail-in registration and telephonic registration S20. Consumer registration is acknowledged and completed through assignment of at least one unique consumer identifier (hereafter "CID") S21. Similarly, the merchant 14 enrolls in the MCN as well S22, with enrollment completed via acknowledgment by the administrative membership entity and assignment of a merchant ID (hereafter "MID") S23. During the merchant enrollment step S22, the merchant may provide varying levels of detailed merchant loyalty program information to the administrative entity which may be stored in a loyalty program database 32 according to MID.

The CIDs may reside on a debit or credit card, e.g., may be same as a debit or credit card number, or may be a different identifier that is held by participating merchants and/or the receipt manager and is linked with a consumer's debit or credit account or finally, the CID may be issued as a stand alone unique identifier that is linked to consumer transactions at the POS by the consumer. In this further embodiment of the present invention, the CID is used to identify a consumer to a membership consolidation network (hereafter "MCN"), which is also accessible by participating merchants as well as the MCN administrative management entity. The MCN may consist of the entire RMN or a subset of individual merchants or alternatively, a set of merchants not enrolled in the RMN. Alternatively or in addition to the consumer's membership in the RMN, the OD may also be associated with consumer's membership information for other merchant programs such as loyalty, shoppers clubs and other memberships such as video store, coffee shop and music store memberships. Consumer data that is associated with the consumer's CID(s) may be stored in a consumer CID database 31. As such, the OD facilitates the consolidation of a consumer's memberships, thus reducing the number of cards and/or ID numbers that must be carried and utilized by a consumer in order to participate in membership programs offered by various merchants.

Each of the consumer's merchant memberships is accessible through the consumer's CID, which acts as a proxy of all other membership numbers and information. Participating merchants can connect to the MCN and agree to accept the OD at the POS each time the consumer uses the OD in association with a purchase from the merchant. In a particular implementation of the further embodiment, a first database at either the merchant or the MCN administrative management entity confirms the CID and the identity of a given consumer and a second database at either the merchant or the MCN administrative management entity associates that OD with the merchant's account number for that consumer's membership with the merchant, in order to facilitate the transaction. Alternatively, the number of databases may vary. The same database may provide all information or the information may be spread over more than two databases. One skilled in the art recognizes the varying system architectures that may be used to facilitate the information storage and transfer described in the embodiments set forth herein.

The information databases may be populated with data in a number of ways. First, participating merchants may provide consumer membership information to the MCN administrative management entity for association with participating consumer CIDs and storage within the appropriate databases accessible through the MCN. This participation information may be provided in a real-time or through a batch process. In a particular embodiment, a participating merchant may associate a new consumer's merchant membership to the consumer's existing CID at the time of assignment of the membership at the POS. Alternatively, the consumer may associate the consumer's various memberships through the MCN administrative management entity, e.g., through a designated website, or the consumer may request a search for all of the consumer's merchant memberships and association with the consumer's CID.

By way of particular example, a consumer attempts to purchase his morning coffee and muffin at his local Starbuck's Coffee shop. The consumer is carrying his OD, which is his credit card number. The consumer has a stored value account with Starbuck's and has a balance of $25.00 in his account. The consumer's account at Starbuck's has been associated with the consumer's CID. When the Starbuck's clerk reads the CID at the POS, the CID, along with Starbuck's merchant ID information from the merchant-side software, is sent over the MCN for (a) verification of the consumer through the CID and (b) recording of the purchase amount in that consumer's Starbucks loyalty account. In parallel, the stored value account is debited for purchase amount via the normal process for Starbucks transactions (not impacted by (a) and (b)).

Although the embodiments presented herein have been described separately in order to highlight different functionalities, one skilled in the art recognizes that the RMN and MCN can be the same network that incorporates, inter alia, the receipt management and membership consolidation functionalities described herein. For example, utilizing the CIDs, the consolidation of the functionalities into a single network facilitates, in addition to receipt management, the tracking of loyalty applications and updating of such applications and rewards based on information mined from a consumer's receipts. Both consumers and merchants are able to access the network to view, in addition to receipt data, the status of different loyalty accounts.

The embodiments presented herein are merely exemplary. One skilled in the art recognized the numerous variations of the presented embodiments that fall within the scope of the invention. Further, one skilled in the art recognizes the supporting frameworks and architecture that are usable with the embodiments presented herein and are presumed known at the time of the filing of this application.

The invention claimed is:

1. A process for managing purchase receipt data comprising:
   enrolling, using a computer, at least one consumer with a receipt manager system by assigning a unique consumer identifier to the at least one consumer;
   associating, using the computer, at least one consumer payment vehicle comprising a credit or debit card with the unique consumer identifier;
   enrolling, using the computer, at least one merchant with the receipt manager system;
   providing, using the computer, the at least one enrolled merchant with software for installation on a purchase processing computer system of the at least one enrolled merchant, the software consisting at least in part of a look-up table for identifying unique consumer identifiers associated with consumer payment vehicles and routing instructions for forwarding purchase receipt data for identified unique consumer identifiers to the receipt manager system;
   receiving, by the computer, purchase receipt data associated with at least one unique consumer identifier identified by the software installed on the purchase processing computer system of the at least one enrolled merchant;
   receiving, by the computer, purchase receipt data associated with at least one unique consumer identifier from the enrolled customer for purchase receipt data involving a non-enrolled merchant; and
   aggregating, using the computer, received purchase receipt data according to the at least one unique consumer identifier.

2. The process according to claim 1, wherein the process further includes associating at least two consumer payment vehicles with the unique consumer identifier.

3. The process according claim 1, further comprising allowing the at least one enrolled consumer and the at least one enrolled merchant to access the aggregated purchase receipt data.

4. The process according to claim 1, wherein the purchase receipt data is received in real-time after each individual purchase.

5. The process according to claim 1, wherein the purchase receipt data is received in batches which contain purchase receipt data for multiple purchases.

6. A process for managing purchase receipt data comprising:
   enrolling, using a computer, at least one consumer with a receipt manager system by assigning a unique consumer identifier to the at least one consumer;
   associating, using the computer, at least one consumer payment vehicle comprising a credit or debit card with the unique consumer identifier;
   enrolling, using the computer, at least one merchant with the receipt manager system;
   providing, using the computer, the at least one enrolled merchant with software for installation on a purchase processing computer system of the at least one enrolled merchant, the software consisting at least in part of a look-up table for identifying unique consumer identifiers associated with consumer payment vehicles and routing instructions for forwarding purchase receipt data for identified unique consumer identifiers to the receipt manager system;
   receiving, using the computer, purchase receipt data associated with at least one unique consumer identifier identified by the software installed on the purchase processing computer system of the at least one enrolled merchant;
   aggregating, using the computer, received purchase receipt data according to the at least one unique consumer identifier; and
   reporting, using the computer, an analysis of the aggregated received purchase receipt data to a plurality of enrolled merchants.

7. A process for managing purchase receipt data comprising:
   enrolling, using a computer, at least one consumer with a receipt manager system by assigning a unique consumer identifier to the at least one consumer, wherein the unique consumer identifier is an account number;
   associating, using the computer, at least one consumer payment vehicle comprising a credit or debit card with the unique consumer identifier;
   enrolling, using the computer, at least one merchant with the receipt manager system;
   providing, using the computer, the at least one enrolled merchant with software for installation on a purchase processing computer system of the at least one enrolled merchant, the software consisting at least in part of a look-up table for identifying unique consumer identifiers associated with consumer payment vehicles and routing instructions for forwarding purchase receipt data for identified unique consumer identifiers to the receipt manager system;

receiving, using the computer, purchase receipt data associated with at least one unique consumer identifier identified by the software installed on the purchase processing computer system of the at least one enrolled merchant;

aggregating, using the computer, received purchase receipt data according to the at least one unique consumer identifier; and allowing, using the computer, access by at least one enrolled merchant to the aggregated received purchase receipt data for at least one unique consumer identifier.

* * * * *